United States Patent Office 2,767,189
Patented Oct. 16, 1956

2,767,189

BENTONITE COMPLEXES AND GREASES DERIVED THEREFROM

John G. Erickson, Minneapolis, Minn., assignor to General Mills, Inc., a corporation of Delaware No Drawing. Application October 9, 1952, Serial No. 313,988

3 Claims. (Cl. 260—293)

The present invention relates to reaction products of bentonite with an aminoquaternary ammonium compound and with a quaternary ammonium compound containing two fatty groups. These reaction products are novel compounds which are particularly useful in the production of greases having unusual properties.

Reaction products of quaternary ammonium compounds containing two fatty groups, with bentonite are known and have been used in the production of greases. The reaction product is apparently a salt of the quaternary ammonium compound with the high molecular weight complex acid which occurs in bentonite in the form of a sodium or potassium salt. When these reaction products are mixed with hydrocarbons, grease-like gels result. Excellent greases can be prepared from heavy mineral oils with these reaction products. A grease of this type has a high flow point and an excellent service life.

It has now been found that reaction products of bentonite with an aminoquaternary ammonium compound and with a quaternary ammonium compound containing two fatty groups have unusual properties and are particularly adapted for use in the production of gelled greases. These materials will be referred to herein as "bentonite-aminoquaternary complexes" or simply as "complexes."

It is, therefore, an object of the present invention to provide novel complexes derived from bentonite and an aminoquaternary ammonium compound and a quaternary ammonium compound containing two fatty groups.

It is a further object of the present invention to provide novel greases prepared from these complexes.

Bentonite occurs in the form of minute platelets, which are microscopic in size. The amino group and the quaternary ammonium group present in the aminoquaternary compound react with the salt groups in the platelets to effect cross-linking between them. These cross-linked reaction products are then reacted with a quaternary ammonium compound containing two fatty groups. In this further reaction, the fatty quaternary ammonium compound reacts with further salt groups in the bentonite.

The aminoquaternary ammonium compounds which can be used in the present invention are of a wide variety. They contain one quaternary ammonium group and one amino group. The amino group may be primary, secondary or tertiary, and should be sufficiently basic to form an acetate salt. The nitrogen atoms of the aminoquaternary ammonium compound can be separated by hydrocarbon groups such as methylene, ethylene, propylene and the like, or by groups containing hetero atoms, such as oxygen, nitrogen or sulphur. This intervening group, likewise, may be a straight or branched chain group and may contain aromatic or heterocyclic nuclei.

A wide variety of substituents may be present on the nitrogen atom of the amino group and of the quaternary ammonium group. These include simple alkyl groups, such as methyl, ethyl, propyl, dodecyl, octadecyl and the like, substituted alkyl groups, as hydroxyethyl, aryl or heterocyclic groups such as phenyl, phthalyl, thienyl, pyridyl and the like. Similarly, these nitrogen atoms can be part of a heterocyclic ring, as in the case of some of the compounds listed hereinafter. Any aminoquaternary ammonium compound can be used which does not include any groups which would interfere with the reaction with the salt groups on the bentonite. Preferably, the aminoquaternary ammonium compound should not contain groups intervening between the nitrogen atoms which are unstable or which might be likely to cleave either during the reaction with the benetonite or at some stage in the use of the compound.

The list appearing below includes typical aminoquaternary ammonium compounds which can be used in the present invention. The amino group in these compounds may be either in the form of the free amine or in the form of a salt. Typical acids which may be used for the formation of the salt include formic, acetic, hydrochloric, nitric, phosphoric and so forth.

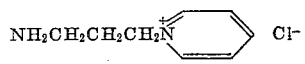

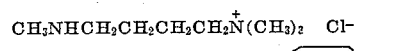

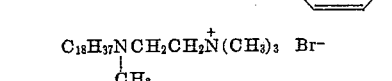

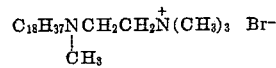

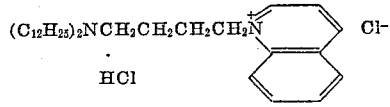

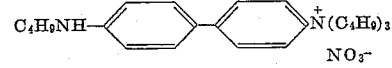

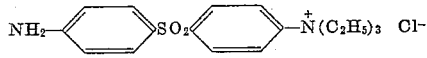

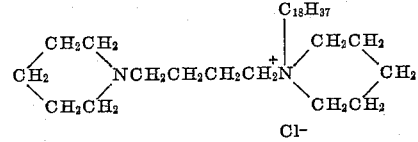

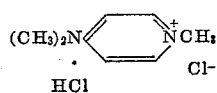

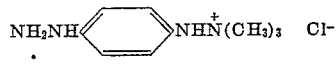

The reaction product of the bentonite and the aminoquaternary ammonium compound is also reacted with a quaternary ammonium compound containing two fatty groups. These quaternary ammonium compounds containing two fatty groups are conventionally employed for the preparation of bentonite complexes, and any of the quaternary ammonium compounds used for that purpose can be used for the present invention. The fatty groups in the quaternary ammonium compounds can contain from 8–22 carbon atoms and can be either saturated or unsaturated. The other substituents on the nitrogen atoms usually are short chain, alkyl groups containing from 1–4 carbon atoms. The anions associated with the quaternary ammonium group may be any of a wide variety. Typical anions include the halides (chloride, bromide, iodide), nitrate, sulphate, phosphate, acetate, formate, chloroacetate, oxylate and benzoate.

In general, it is preferred to employ sufficient of the fatty quaternary ammonium compound and the aminoquaternary ammonium compound to react with all of the salt groups of the bentonite. The best results are obtained when less than 1 equivalent of the aminoquaternary ammonium compound is used for each 10 equivalents of the fatty quaternary ammonium compound. By the equivalent weight of the aminoquaternary ammonium compound is meant the molecular weight of the compound divided by the total number of amino and quaternary ammonium groups present therein.

It is not possible to specify precisely the amount of aminoquaternary ammonium compound to use, since this depends upon the nature of the hydrocarbon to be gelled, the nature of the aminoquaternary ammonium compound, and the use to which the grease is to be put. It has been definitely established, however, that some of the aminoquaternary ammonium compound is required in order to obtain the benefits of the present invention. Even minute quantities of the aminoquaternary ammonium compound are found to be beneficial. It has also been established that 1 equivalent of the aminoquaternary ammonium compound per 10 equivalents of the fatty quaternary ammonium compound appears to be near the upper limit.

In preparing the bentonite complex, the bentonite is dispersed in water in the form of a dilute dispersion, for example, a 1% dispersion. The aminoquaternary ammonium compound is then dissolved in a suitable solvent, which in many instances may be water. This solution is then added to the bentonite dispersion. The fatty quaternary ammonium compound is then dissolved in a suitable solvent and is added to the dispersion. The reaction is preferably carried out at room temperature, inasmuch as the reaction obtained at this temperature is adequate. The reaction involves the simple admixing of the aminoquaternary ammonium compound and the fatty quaternary ammonium compound with the bentonite dispersion. The reaction proceeds readily, and the complex appears as a flocculent precipitate which comes down almost immediately upon admixing the reactants. The product can readily be recovered by simple filtration and drying.

The complexes of bentonite and the aminoquaternary ammonium compound and the fatty quaternary ammonium compound can be used to gel liquid organic materials which are essentially hydrocarbon in nature. These include ordinary liquid petroleum hydrocarbons, mineral oils, lubricating oils, aromatic liquid hydrocarbons as well as halogenated hydrocarbons. In preparing these gels, the complex described above is reduced to a finely divided powder and then incorporated into the oil and thoroughly distributed therein. This can be accomplished by means of a coloid mill or a paint mill. The products are, in general, extremely stiff greases. The comparative stiffness of these greases has been determined by measuring the load in grams necessary to start rotation of a spindle (in the form of a bent steel rod) attached to a Stormer viscosity machine. The higher the load required to rotate the spindle in the grease, the greater the stiffness. In general, the stiffness of the grease produced from the combination of the aminoquaternary ammonium compound and the fatty quaternary ammonium compound is several times that of comparable greases made with complexes derived from the fatty quaternary ammonium compound alone. Some of these results will be evident from the examples given hereinafter. Another factor which is important in greases of this type is the ability of the grease to hold the oil and to keep it from separating. The examples, likewise, demonstrate a superiority in this respect of the present products over the ordinary bentonite complex greases.

Example 1

Tributylamine was heated with excess triglycol dichloride. Removal of the excess triglycol dichloride left a chloroquaternary compound, $$ClCH_2CH_2OCH_2CH_2OCH_2CH_2\overset{+}{N}(C_4H_9)_3$$
$$Cl^-$$

This was heated with excess diethylamine to yield the hydrochloride of 2-[2-(2-diethylaminoethoxy)ethoxy] ethyltributylammonium chloride. Seven one-hundredths of a part of this salt was dissolved in water and added to 1000 parts of a 1% aqueous dispersion of bentonite. A solution of 5.5 parts of dioctadecyldimethylammonium chloride in isopropyl alcohol was then added. The mixture was filtered and the precipitate was washed and dried. When milled into heavy mineral oil at 10% solids content, it gave a grease of stiffness 950. When diluted to 5% solids by milling in more oil, it formed a grease of stiffness 150, not separating oil upon standing.

A similar grease, prepared as described above but without the aminoquaternary compound, at 10% solids had stiffness 125. This was diluted to 5% solids by milling in oil; the product so obtained separated oil upon standing.

Example 2

The free base, 2-[2-(2-diethylaminoethoxy)ethoxy] ethyltributylammonium chloride, was prepared by adding the calculated amount of sodium hydroxide solution to an aqueous solution of the hydrochloride. An aqueous solution containing 0.09 part of this aminoquaternary ammonium compound was added to 1000 parts of 1% aqueous bentonite dispersion. A solution of 5.5 parts of dimethyl dioctadecylammonium chloride in isopropyl alcohol was then added. The precipitate was filtered off, dried and milled into heavy mineral oil. At 10% solids, it gave a grease of stiffness 800.

Example 3

The hydrochloride of N-(4-piperidinobutyl)-pyridinium chloride was prepared in a manner similar to that described in Example 1. An aqueous solution of 0.07 part of this compound was added to 1000 parts of 1% aqueous bentonite dispersion. An isopropyl alcohol solution of 5.5 parts of dioctadecyldimethylammonium chloride was then added. The precipitate was washed, dried and milled into heavy mineral oil. At 10% solids, it gave a grease of stiffness 300.

Example 4

The free base, N-(4-piperidylbutyl)-pyridinium chloride, was prepared from the hydrochloride of Example 3 by adding the calculated amount of sodium hydroxide. An aqueous solution of 0.07 part of this free base was added to 1000 parts of 1% aqueous bentonite dispersion. A solution of 5.5 parts of dioctadecyldimethylammonium chloride in isopropyl alcohol was then added. The precipitate was filtered off, washed and dried. When milled into heavy mineral oil, it gave a thick grease, stiffness 300.

Any of the aminoquaternary ammonium compounds referred to in the previously given list may be substituted for those given in the examples, with similar results.

I claim as my invention:

1. A bentonite complex consisting essentially of the reaction product of bentonite and (a) an amino quaternary ammonium compound having the formula ARQ in which A is an amino group selected from the group consisting of primary, secondary, and tertiary amino groups in which any substituents are alkyl groups of from 1–18 carbon atoms, and amino groups which are a part of a heterocyclic ring, R is selected from the group consisting of alkylene and polyoxyalkylene, and Q is a quaternary ammonium group selected from it consisting of quaternary ammonium groups in which the nitrogen atom is substituted by alkyl groups of from 1–18 carbon atoms and those in which the nitrogen atom is a part of a heterocyclic ring and (b) a monoquaternary ammonium compound having two long chain alkyl groups attached to the nitrogen atom, each of said long chain alkyl groups containing from 8 to 22 carbon atoms, said nitrogen atom being selected from the group consisting of nitrogen atoms substituted with two short chain alkyl groups containing from 1 to 4 carbon atoms and nitrogen atoms forming part of a heterocyclic ring, the quantity of (a) being less than one equivalent for 10 equivalents of (b) but sufficient to materially stiffen a grease made from said complex, the total of (a) and (b) being such that essentially all of the exchangeable metal cation in the bentonite is replaced by the cations of (a) and (b).

2. A bentonite complex consisting essentially of the reaction product of bentonite and (a) 2-[2-(2-di-ethyl-aminoethoxy)ethoxy] ethyltributylammonium chloride and (b) a quaternary ammonium compound having two long chain alkyl groups, each containing from 8–22 carbon atoms and two short chain alkyl groups containing from 1–4 carbon atoms attached to the nitrogen atom, the compound of (a) being employed in a quantity of less than one equivalent per 10 equivalents of (b) but sufficient to materially stiffen a grease made from said complex, the total quantity of (a) being less than one equivalent per 10 equivalents of (b), the total quantity of (a) and (b) being such that essentially all of the exchangeable metal cation in the bentonite is replaced by the cations of (a) and (b).

3. A bentonite complex consisting essentially of the reaction product of bentonite and (a) N-(4-piperidino-butyl)-pyridinium chloride and (b) a quaternary ammonium compound having two long chain alkyl groups, each containing from 8–22 carbon atoms and two short chain alkyl groups containing from 1–4 carbon atoms attached to the nitrogen atom, the total quantity of (a) being less than one equivalent per 10 equivalents of (b) but sufficient to materially stiffen a grease made from said complex, the total quantity of (a) and (b) being such that essentially all of the exchangeable metal cation in the bentonite is replaced by the cations of (a) and (b).

References Cited in the file of this patent

UNITED STATES PATENTS

| | | |
|---|---|---|
| 2,531,396 | Carter et al. | Nov. 28, 1950 |
| 2,531,427 | Hauser | Nov. 28, 1950 |
| 2,531,440 | Jordan | Nov. 28, 1950 |
| 2,559,398 | Capell | July 3, 1951 |
| 2,626,241 | Sparks et al. | Jan. 20, 1953 |